United States Patent [19]

Maly et al.

[11] Patent Number: 5,328,636
[45] Date of Patent: Jul. 12, 1994

[54] RUBBER VULCANIZATION SYSTEM CONTAINING BIS-(2,5-POLYTHIO-1,3,4-THIADIAZOLE), BISMALEIMIDE AND SULFENAMIDE

[75] Inventors: Neil A. Maly, Tallmadge; Richard M. D'Sidocky, Ravenna; Lewis T. Lukich, Akron, all of Ohio

[73] Assignee: The Goodyear Tire & Rubber Company, Akron, Ohio

[21] Appl. No.: 89,535

[22] Filed: Jul. 12, 1993

Related U.S. Application Data

[62] Division of Ser. No. 935,699, Aug. 26, 1992, Pat. No. 5,262,488.

[51] Int. Cl.$^5$ .............................................. C08K 5/46
[52] U.S. Cl. ............................................. 252/182.17
[58] Field of Search ....................... 252/182.17, 182.14

[56] References Cited

U.S. PATENT DOCUMENTS

| | | |
|---|---|---|
| 3,087,932 | 4/1963 | Little, Jr. . |
| 3,663,561 | 5/1972 | Blaha . |
| 4,599,425 | 7/1986 | Hugo et al. ........................ 548/142 |
| 4,933,385 | 6/1990 | Yamamoto et al. ................ 524/105 |
| 4,960,833 | 10/1990 | Nagasaki et al. ................. 525/329.3 |

FOREIGN PATENT DOCUMENTS 1235026  6/1971  United Kingdom .

OTHER PUBLICATIONS

A. S. Prashchikina, et al, Kauchuk i Rezina, No. 7, (1979), p. 14.
Abstract for JP 030565544.
Abstract for the IRC—85 Kyoto; International Rubber Conference proceedings in Kyoto, Japan, Oct. 15–18, 1985, Paper 18J01, pp. 875–880.
Jablonowski, T. L., "TBzTD and CBBS—Alternative Accelerators for Reducing Nitrosamine Generation", Rubber World, (1992), pp. 18–22.

*Primary Examiner*—Christopher Henderson
*Attorney, Agent, or Firm*—Bruce J. Hendricks

[57] ABSTRACT

This invention relates to the discovery that bis-(2,5-polythio-1,3,4-thiadiazole) in combination with a bismaleimide compound and a sulfenamide compound provides for excellent vulcanization of rubbers and results in an improved final rubber vulcanizate possessing superior physical properties and reversion resistance.

9 Claims, No Drawings

RUBBER VULCANIZATION SYSTEM CONTAINING BIS-(2,5-POLYTHIO-1,3,4-THIADIAZOLE), BISMALEIMIDE AND SULFENAMIDE

This is a divisional of U.S. patent application Ser. No. 07/935,699, filed on Aug. 26, 1992, now issued as U.S. Pat. No. 5,262,488.

BACKGROUND OF THE INVENTION

This invention relates to the vulcanization of diene elastomers. More particularly, the invention relates to an improved accelerator composition for the vulcanization of diene elastomers as well as to a method of vulcanization therewith.

In the manufacture of rubber articles, crude or raw rubber is compounded with various ingredients among which are sulfur and accelerators of vulcanization. The primary function of an accelerator or accelerator system is to increase the rate of the vulcanization process while allowing sufficient time to mix the accelerators into the rubber at an elevated temperature before vulcanization commences. This delay before the initiation of vulcanization is commonly referred to as scorch time.

The properties of a final rubber vulcanizate that are of importance include tensile strength, set, hysteresis, aging properties, reversion resistance and others. Other factors relating to the vulcanization which are of importance are the rate of cure, the cure time, the scorch behavior, the extent of cure, and tear resistance. These physical properties can be altered either beneficially or detrimentally through the inclusion of chemicals or components that impact upon the rate and state of vulcanization.

Many accelerator combinations have been used in the rubber industry. Unfortunately, many of the known accelerators, such as morpholine containing accelerators, and dimethylamine containing accelerators yield volatile nitrosamines upon use. The use of accelerators which yield volatile nitrosamines have been significantly restricted in a number of countries and the need to find a suitable replacement is eminent.

SUMMARY OF THE INVENTION

The present invention relates to a vulcanization composition for natural rubber, rubbers derived from diene monomers or mixtures thereof. The vulcanization composition comprises (a) a bis-(2,5-polythio-1,3,4-thiadiazole); (b) a bismaleimide; (c) a sulfenamide compound and (d) sulfur, a sulfur donor or mixture thereof.

DETAILED DESCRIPTION OF THE INVENTION

There is disclosed a rubber vulcanization composition comprising:

(a) from about 2 to about 15 weight percent of bis-(2,5-polythio-1,3,4-thiadiazole) consisting of the formula:

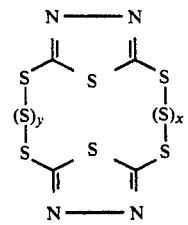

wherein the sum of x and y is from 1 to 16 and x and y are independently selected from 0 and integers of from 1 to 8;

(b) from about 15 to about 50 weight percent of a bismaleimide compound of the general formula:

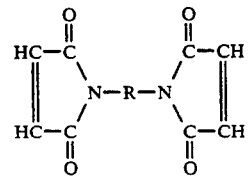

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms and wherein these divalent groups may contain a hetero atom selected from O, N and S;

(c) from about 15 to about 45 weight percent of a sulfenamide compound of the general formula:

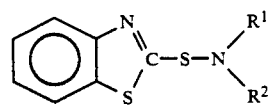

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

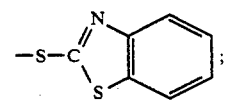

and (d) from about 20 to about 55 weight percent of sulfur, a sulfur donor or mixtures thereof.

There is also disclosed a rubber stock comprising:

(a) a rubber selected from the group consisting of natural rubber, a rubber derived from a diene monomer and mixture thereof;

(b) from about 0.10 to about 0.75 phr of bis-(2,5-polythio-1,3,4-thiadiazole) consisting of the formula:

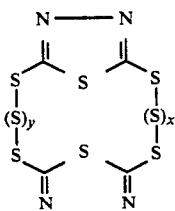

(I)

wherein the sum of x and y is from 1 to 16 and x and y are independently selected from 0 and integers of from 1 to 8;

(c) from about 0.5 to about 3 phr of a bismaleimide compound of the general formula:

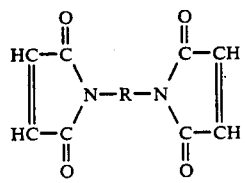

(II)

wherein R is divalent and is selected from the group consisting of acyclic aliphatic groups having from about 2 to 16 carbon atoms, cyclic aliphatic groups having from about 5 to 20 carbon atoms, aromatic groups having from about 6 to 18 carbon atoms, and alkylaromatic groups having from about 7 to 24 carbon atoms and wherein these divalent groups may contain a hetero atom selected from 0, N and S;

(d) from about 0.5 phr to about 3 phr of a sulfenamide compound of the general formula:

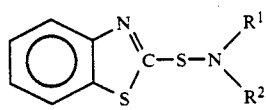

(III)

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

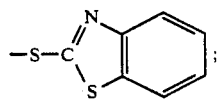

and (e) from about 0.5 to about 6 phr of sulfur, a sulfur donor or mixtures thereof.

The first essential component in the claimed invention is bis-(2,5-polythio-1,3,4-thiadiazole). When the bis-(2,5-polythio-1,3,4-thiadiazole) is viewed as part of a vulcanization system, it is generally present in an amount of from about 2 to about 15 weight percent. Preferably, the bis-(2,5-polythio-1,3,4-thiadiazole) is in an amount of from about 2.5 to 12.5 weight percent. When the vulcanization system of the present invention is added to a rubber stock, the bis-(2,5-polythio-1,3,4-thiadiazole) is present in an amount of from about 0.10 to 0.75 phr. Preferably, the bis-(2,5-polythio-1,3,4-thiadiazole) is present in an amount ranging from about 0.10 to about 0.50 phr.

Bis-(2,5-polythio-1,3,4-thiadiazoles) may be prepared by reacting 2,5-dimercapto-1,3,4-thiadiazole and elemental sulfur in water with hydrogen peroxide at a temperature ranging from 20° C. to 100° C. wherein the molar ratio of 2,5-dimercapto-1,3,4-thiadiazole to hydrogen peroxide is from 1:1 to 1:1.25 and the molar ratio of 2,5-dimercapto-1,3,4-thiadiazole to elemental sulfur ranges from 16:1 to 1:1.

The reaction product of the above reaction may consist of a mixture of bis-(2,5-polythio-1,3,4-thiadiazoles), all of which may vary in molecular weight. For example, referring to the above structural formula, there may be a mixture of the materials wherein x and y may range from 0 to 8 so long as the sum of x and y is at least 1 and up to 16. Preferably, x and y are integers ranging from about 2 to 4. The molecular weight of the reaction product will vary depending on the ratio of reactants, temperature of the reaction and reaction time. The molecular weight of the composition of the present invention may range from about 328 to about 808. Preferably, the molecular weight of the reaction product ranges from about 424 to 552.

In accordance with the process of making the bis(2,5-polythio-1,3,4-thiadiazoles), the mole ratio of 2,5-dimercapto-1,3,4-thiadiazole to sulfur may range from about 16:1 to 1:1. Preferably, the mole ratio ranges from about 4:1 to 2:1.

The mole ratio of 2,5-dimercapto-1,3,4-thiadiazole to hydrogen peroxide should range from about 1:1 to 1:1.5. Preferably, the mole ratio is from 1:1 to 1:1.25.

The 2,5-dimercapto-1,3,4-thiadiazole and elemental sulfur in water are reacted with hydrogen peroxide. The term elemental sulfur is used herein to describe the $S_8$ or rhombic form of sulfur.

The reaction may be conducted over wide temperatures. In general, the reaction may be conducted at a temperature of from about 20° C. to about 100° C. Preferably, the condensation reaction is conducted at a temperature ranging from about 50° C. to about 95° C.

The reaction between the 2,5-dimercapto-1,3,4-thiadiazole, elemental sulfur and hydrogen peroxide may be conducted under a variety of pressures, with atmospheric pressure being preferred. The reaction may be conducted under an inert atmosphere or air. Preferably, the atmosphere is air.

The reaction is conducted for a sufficient time upon heating and isolation to result in the bis-(2,5-polythio-1,3,4-thiadiazole). In general, the reaction time may vary from about 1 hour to about 8 hours.

Upon completion of the reaction, the bis-(2,5-polythio-1,3,4-thiadiazole) is isolated. The method of isolation is conventional and well known to those skilled in the art and may consist of permitting the reaction mixture to cool for subsequent use or by simple vacuum filtration.

The bismaleimide is the second essential component in the claimed invention. When the bismaleimide is viewed as part of a vulcanization system, it is 15 to 50 weight percent. Preferably, the bismaleimide is in an amount of from about 20 to 36 weight percent. When the vulcanization system of the present invention is added to a rubber stock, the bismaleimide is present in an amount of from about 0.5 to 3 phr. Preferably, the bismaleimide is present in an amount ranging from about 0.65 to about 2 phr.

Representative of the bismaleimides of formula II and which may be used in the present invention include N,N'-ethylenebismaleimide, N,N'-hexamethylenebismaleimide, N,N'-dodecamethylenebismaleimide, N,N'-(2,2,4-trimethylhexamethylene)bismaleimide N,N'-(oxydipropylene)bismaleimide, N,N'-(aminodipropylene)-bismaleimide, N,N'- (ethylenedioxydipropylene)-bismaleimide, N,N'-(1,4-cyclohexylene)bismaleimide, N,N'-(1,3-cyclohexylene)bismaleimide, N,N'-(methylene-1,4-dicyclohexylene)bismaleimide, N,N'-(isopropylidene-1,4-dicyclohexylene)bismaleimide, N,N'-(oxy-1,4-dicyclohexylene)bismaleimide, N,N'-(m-phenylene)bismaleimide, N,N'-p-(phenylene)-bismaleimide, N,N'-(o-phenylene)bismaleimide, N,N'-(1,3-naphthylene)bismaleimide, N,N'-(1,4-naphthylene)bismaleimide, N,N'-(1,5-naphthylene)bismaleimide, N,N-(3,3'-dimethyl-4,4'-diphenylene)bismaleimide, N,N'-(3,3-dichloro-4,4'-biphenylene)bismaleimide, N,N'-(2,4-pyridyl)bismaleimide, N,N'-(2,6-pyridyl)bismaleimide, N,N'-(1,4-anthraquinonediyl))bismaleimide, N,N'-(m-tolylene)bismaleimide, N,N'-(p-tolylene)bismaleimide, N,N'-(4,6-dimethyl-1,3-phenylene)bismaleimide, N,N'-(2,3-dimethyl-1,4-phenylene)bismaleimide, N,N'-(4,6-dichloro-1,3-phenylene)bismaleimide, N,N'-(5-chloro-1,3-phenylene)-bismaleimide, N,N'-(5-hydroxy-1,3-phenylene)bismaleimide, N,N'-(5-methoxy-1,3-phenylene)bismaleimide, N,N'-(m-xylylene)bismaleimide, N,N'-(p-xylylene)bismaleimide, N,N'-(methylenedi-p-phenylene)bismaleimide, N,N'-(isopropylidenedi-p-phenylene)bismaleimide, N,N'-(oxydi-p-phenylene)bismaleimide, N,N'-(thiodi-p-phenylene)-bismaleimide, N,N'-(dithiodi-p-phenylene)bismaleimide, N,N'-(sulfodi-p-phenylene)bismaleimide, N,N'-(carbonyldi-p-phenylene)bismaleimide, α,α-(4-maleimidophenyl)-metadiisopropylbenzene, α,α-bis-(4-p-phenylene)bismaleimide and α,α-bis-(4-maleimidophenyl)-paradiisopropylbenzene. The preferred bismaleimide is N,N'-(m-phenylene)bismaleimide.

The sulfenamide compound of formula III is the third essential component of the present invention. When the sulfenamide is viewed as part of a vulcanization system, it is generally present in an amount of from about 15 to 45 weight percent. Preferably, the sulfenamide compound is present in an amount of from about 17 to 42 weight percent. When the vulcanization system of the present invention is added to a rubber stock, the sulfenamide is present in an amount of from about 0.5 to about 3 phr. Preferably, the sulfenamide is present in an amount ranging from about 0.70 to about 2.0 phr.

Representative of the sulfenamide compounds of formula III and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2-benzothiazylsulfenamide, and N-t-butylbis-(2-benzothiazylsulfen)amide. Preferably, the sulfenamide compound is N-cyclohexyl-2-benzothiazylsulfenamide.

Rubber stocks may be used with the rubber vulcanization composition of the present invention. Examples of rubbers include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methylcyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The preferred rubbers which may be used with the present invention are cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used. Generally speaking the amount of sulfur vulcanizing agent in the vulcanization system of the present invention ranges from about 20 to about 55 weight percent. Preferably, the sulfur vulcanizing agent ranges from about 23 to 43 weight percent. When the vulcanization system of the present invention is added to a rubber stock, the sulfur vulcanizing agent is present in an amount ranging from about 0.5 to about 6 phr. Preferably, the sulfur vulcanizing agent is present in an amount ranging from about 0.75 phr to about 2.0 phr.

Conventional rubber additives may be incorporated in the rubber stock of the present invention. The additives commonly used in rubber stocks include fillers, plasticizers, waxes, processing oils, retarders, antiozonants, antioxidants and the like. The total amount of filler that may be used may range from about 30 to about 150 phr, with a range of from about 45 to about 70 phr being preferred. Fillers include silicas, clays, calcium carbonate, calcium silicate, titanium dioxide and carbon black. HAF Black (N-330) and GPF-Black (N-660) are commonly used in rubber stocks intended for use as wire coats or carcass ply coats. Preferably, at least a portion of the filler is carbon black. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, hydrogenated esters of rosin acid, pentachlorophenol, saturated and unsaturated hydrocarbons and nitrogen bases, coal tar products, brominated methyol resins, cumarone-indene resins and esters such as dibutylphthalate and tricresyl phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

In-situ resins may be used in the rubber stock and involve the reaction of resorcinol and a methylene donor. The term "methylene donor" is intended to mean a compound capable of reacting with the resorcinol and generate the resin in-situ. Examples of methylene donors which are suitable for use in the present invention include hexeumethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

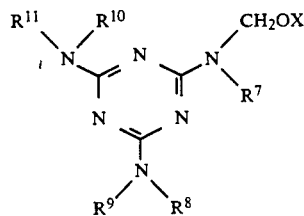

wherein X is an alkyl having from 1 to 8 carbon atoms, $R^7$, $R^8$, $R^9$, $R^{10}$ and $R^{11}$ are individually selected from the group consisting of hydrogen, an alkyl having from 1 to 8 carbon atoms, the group $-CH_2OX$ or their condensation products. Specific methylene donors include hexakis-(methoxymethyl)melamine, N,N',N''-trimethyl/N,N'N''-trimethylolmelamine, hexamethylolmelamine, N,N',N''-dimethylolmelamine, N-methylolmelamine, N,N'-dimethylolmelamine, N,N', N''-tris(methoxymethyl)melamine and N,N'N''-tributyl-N,N',N''-trimethylol-melamine. The N-methylol derivatives of melamine are prepared by known methods.

The amount of methylene donor and resorcinol that is present in the rubber stock may vary. Typically, the amount of methylene donor and resorcinol that is present will range from about 0.1 phr to 10.0 phr. Preferably, the amount of methylene donor and resorcinol ranges from about 2.0 phr to 5.0 phr.

The weight ratio of methylene donor to the resorcinol may vary. Generally speaking, the weight ratio will range from about 1:10 to about 10:1. Preferably, the weight ratio ranges from about 1:3 to 3:1.

Preformed phenol-formaldehyde type resins may be used in the rubber stock and are generally present in an amount ranging from about 1.0 to about 5.0 phr, with a range of from about 1.5 to about 3.5 phr being preferred.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282-286. Antidegradants are generally used in amounts from about 0.25 to about 5.0 phr with a range of from about 1.0 to about 3.0 phr being preferred.

The present invention may be better understood by reference to the following examples in which the parts or percentages are by weight unless otherwise indicated.

EXAMPLE 1

Preparation of Bis(2,5-tetrathio-1,3,4-thiadiazole)

In a 1000 milliliter reaction flask, a mixture of 30 grams (0.20 mole) of 2,5-dimercapto-1,3,4-thiadiazole and 12.8 grams (0.05 mole) of elemental sulfur was prepared in 250 ml of water. The slurry was stirred at high speed and a pale yellow suspension resulted. To the slurry was added 29.4 grams (0.259 mole) of 30% hydrogen peroxide over a five minute period. During the addition of the peroxide, the temperature increased to 38° C. and the reaction slurry became thicker and bright orange. The slurry was stirred with heating until a temperature of 70° C. was obtained. Heating at 70° C. was continued for one hour. During this heating period, the solids turned white. The heating was increased to 95° C. and stirring continued for 5 hours. The solids were collected by suction filtering end dried in a vacuum oven. 40.2 grams of product were recovered (94.8% yield). The product exhibited shrinkage at 145° to 155° C., followed by an amorphous state at 156° to 170° C. and decomposed with gassing at 171° to 175° C.

EXAMPLE 2

Table I below shows the basic rubber stock that was used in this example. The rubber stock was prepared in a two-stage Banbury ® mix. In addition to the components listed in Table I, conventional amounts of carbon black, plasticizers, stearic acid, zinc oxide, and antidegradant were added to the first Banbury ® stage. All parts and percentages in Table I are by weight unless otherwise noted. The bis-(2,5-polythio-1,3,4-thiadiazole) that was used in this example was bis-(2,5-tetrathio-1,3,4-thiadiazole) prepared in accordance with the method of Example 1.

ing disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

TABLE I

| Sample | Control 1 | 2 | 3 | 4 | 5 | 6 | Control 7 |
|---|---|---|---|---|---|---|---|
| Nonproductive | | | | | | | |
| Natural Rubber | 100.00 | 100.00 | 100.00 | 100.00 | 100.00 | 100.00 | 100.00 |
| PRODUCTIVE | | | | | | | |
| Sulfur | 1.40 | 1.40 | 1.40 | 1.40 | 1.40 | 1.40 | 1.40 |
| CBTS[1] | 1.10 | 1.10 | 1.10 | 1.10 | 1.10 | 1.10 | 1.10 |
| Bismaleimide[2] | | 0.50 | 1.00 | 1.00 | | 0.50 | 1.00 |
| BTTTD[3] | 0.10 | 0.25 | 0.40 | 0.10 | 0.40 | 0.25 | |
| TBTD[4] | | | | | | | 0.10 |

[1]N-cyclohexyl-2-benzothiazylsulfenamide.
[2]N,N'-(m-phenylene)bismaleimide.
[3]Bis-(2,5-tetrathio-1,3,4-thiadiazole) referred to in Table I as BTTTD.
[4]Tetrabenzylthiuram disulfide.

Cure properties were determined using a Monsanto oscillating disc rheometer which was operated at a temperature of 135° C. and 100 cycles per minute. A description of oscillating disc rheometers can be found in the Vanderbilt Rubber Handbook edited by Robert 0. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of *The Vanderbilt Rubber Handbook*.

In such an oscillating disc rheometer, compounded rubber samples are subjected to an oscillating shearing action of constant amplitude. The torque of the oscillating disc embedded in the stock that is being tested that The following tables report cure properties that were determined from cure curves than were obtained for the rubber stocks that were prepared. These properties include a torque minimum (Min. Torque), a torque maximum (Max. Torque), minutes to a 2 point (min/dNm) of the torque increase (t2), minutes to 25% of the torque increase (t25), minutes to 90% of the torque increase (t90) and difference between the maximum torque and minimum torque (delta torque).

Table II indicates the respective amounts of sulfur, N-cyclohexyl benzothiazole-2-sulfenamide, N,N'-(m-phenylene)bismaleimide, tetrabenzylthiuram disulfide and bis-(2,5-tetrathio-1,3,4-thiadiazole).

TABLE II

| Sample | Control 1 | 2 | 3 | 4 | Control 5 | Control 6 | Control 7 |
|---|---|---|---|---|---|---|---|
| Sulfur | 1.40 | 1.40 | 1.40 | 1.40 | 1.40 | 1.40 | 1.40 |
| CBTS[1] | 1.10 | 1.10 | 1.10 | 1.10 | 1.10 | 1.10 | 1.10 |
| Bismaleimide[2] | | 0.50 | 1.00 | 1.00 | | 0.50 | 1.00 |
| BTTTD[3] | 0.10 | 0.25 | 0.40 | 0.10 | 0.40 | 0.25 | |
| TBTD[4] | | | | | | | 0.10 |
| Stress Strain for 15 min. Cure @ 135° C. | | | | | | | |
| Tensile @ Break (MPa) | 22.3 | 21.5 | 21.4 | 22.3 | 21.7 | 22.3 | 22.6 |
| Elongation @ Break (%) | 526 | 504 | 477 | 507 | 520 | 521 | 495 |
| 100% Modulus (MPa) | 2.3 | 2.5 | 2.7 | 2.5 | 2.3 | 2.4 | 2.7 |
| 200% Modulus (MPa) | 6.1 | 6.6 | 7.2 | 6.8 | 6.1 | 6.4 | 7.3 |
| 300% Modulus (MPa) | 11.6 | 12.1 | 13.2 | 12.6 | 11.5 | 12.0 | 13.3 |
| Strebler Adhesion Avg. Load (Newtons) | 223.7 | 188.2 | 178.5 | 187.8 | 210.3 | 205.7 | 184.6 |

| Sample | Control 1 | 2 | 3 | 4 | Control 5 | 6 | Control 7 |
|---|---|---|---|---|---|---|---|
| Sulfur | 1.40 | 1.40 | 1.40 | 1.40 | 1.40 | 1.40 | 1.40 |
| CBTS[1] | 1.10 | 1.10 | 1.10 | 1.10 | 1.10 | 1.10 | 1.10 |
| Bismaleimide[2] | | 0.50 | 1.00 | 1.00 | | 0.50 | 1.00 |
| BTTTD[3] | 0.10 | 0.25 | 0.40 | 0.10 | 0.40 | 0.25 | |
| TBTD[4] | | | | | | | 0.10 |
| Rheometer @ 135° C. | | | | | | | |
| Max. Torque (dNm) | 40.5 | 41.8 | 45.6 | 44.4 | 41.4 | 43.2 | 47.8 |
| Min. Torque (dNm) | 12.6 | 11.2 | 11.7 | 11.5 | 12.4 | 13.3 | 13.5 |
| Delta Torque (dNm) | 27.9 | 30.6 | 33.9 | 32.9 | 29.0 | 29.9 | 34.3 |
| T90 (min.) | 27.2 | 29.4 | 32.2 | 37.0 | 25.9 | 29.7 | 38.4 |
| T25 (min.) | 16.0 | 13.6 | 12.8 | 18.0 | 12.0 | 13.9 | 22.5 |
| T2 (min.) | 13.1 | 9.5 | 8.6 | 12.3 | 9.1 | 9.9 | 17.0 |
| Cure Reversion, %/min. @ 150° C. | 0.14 | 0.13 | 0.08 | 0.07 | 0.19 | 0.13 | 0.04 |
| Stress Strain for Cured Samples Aged 3 Days @ 100° C. | | | | | | | |
| Tensile @ Break (MPa) | 16.0 | 16.0 | 16.3 | 16.4 | 15.9 | 16.0 | 13.8 |

TABLE II-continued

| | | | | | | | |
|---|---|---|---|---|---|---|---|
| Elongation @ Break (%) | 353 | 351 | 337 | 349 | 368 | 351 | 289 |
| 100% Modulus (MPa) | 3.0 | 3.1 | 3.4 | 3.3 | 2.9 | 3.0 | 3.6 |
| 200% Modulus (MPa) | 8.0 | 8.2 | 9.0 | 8.6 | 7.6 | 8.1 | 9.4 |
| 300% Modulus (MPa) | 14.4 | 14.6 | 15.5 | 15.2 | 13.6 | 14.5 | |
| Strebler Adhesion Avg. Load (Newtons) | 58.5 | 48.3 | 39.7 | 48.5 | 54.7 | 56.9 | 37.7 |

[1] N-cyclohexyl-2-benzothiazylsulfenamide.
[2] N,N'-(m-phenylene)bismaleimide.
[3] Bis-(2,5-tetrathio-1,3,4-thiadiazole) referred to in Table I as BTTTD.
[4] Tetrabenzylthiuram disulfide.

Control Sample 1 and Control Sample 5 represent cure compositions containing the tetrathio-thiadiazole (BTTTD) in combination with conventional sulfur and CBTS curatives. Cure states as reflected by Rheometer delta torque were measured respectively at 27.9 dNm and 29.0 dNm for Control Sample 1 and Control Sample 5. Bismaleimide addition to the controls increased cure states 9.6% for Comparative Sample 3 when bismaleimide was added to Control Sample 1 and 10.1% for Comparative Sample 4 when bismaleimide was added to Control Sample 5. At the same time cure reversion resistance as measured by percent drop in cure state per min. time was significantly improved with the total cure composition. Note Control Sample 1 and Control Sample 5 had reversion rates of 0.14%/min. and 0.19%/min. loss whereas addition of bismaleimide to complete the cure composition reduced cure reversion to 0.07%/min. (Sample 4) and 0.08%/min. (Sample 3) when the samples were tested at 150° C. to induce reversion.

Modulus and tensile values illustrated in Table II likewise reflect the advantage of the total cure composition versus one of the components removed. Control Sample 1 and Control Sample 5, with bismaleimide removed, yielded lower modulus values (a reflection of a lower cure state) versus the total cure composition containing bismaleimide. Compare Control Sample 1 (300% M of 11.6 MPa) versus Sample 4 (300% M of 12.6 MPa) and Control Sample 5 (300% M of 11.5 MPa) versus Sample 3 (300% M of 13.2 MPa).

As a comparative example (Control Sample 7), TBTD was used in place of BTTTD (Sample 4) to evaluate the importance of BTTTD versus a thiuram disulfide in this composition. Note BTTTD gave faster cure times at similar tensile, elongation and tear. However, aged tear was found to be 29% better (48.5N tear force) for the composition containing S/CBTS/bismaleimide/BTTTD (Sample 4) versus the composition where TBTD replaced BTTTD (Control Sample 7, 37.7N tear force).

In summary, the use of the S/CBTS/bismaleimide/BTTTD composition will provide improvements in cure state, cure reversion, and aged tear.

What is claimed is:
1. A rubber vulcanization composition comprising:
    (a) from about 2 to about 15 weight percent of bis-(2,5-polythio-1,3,4-thiadiazole) consisting of the formula:

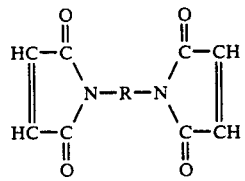

wherein the sum of x and y is from 1 to 16 and x and y are independently selected from 0 and integers of from 1 to 8;
(b) from about 15 to about 50 weight percent of a bismaleimide compound of the general formula:

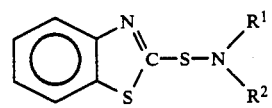

wherein R is divalent and is selected from the group consisting of acyclic aliphatic groups having from about 2 to 16 carbon atoms, cyclic aliphatic groups having from about 5 to 20 carbon atom, aromatic group having from about 6 to 18 carbon atoms, and alkylaromatic groups having from about 7 to 24 carbon atoms and wherein these divalent groups may contain a hetero atom selected from 0, N and S;
(c) from about 15 to about 45 weight percent of a sulfenamide compound of the general formula:

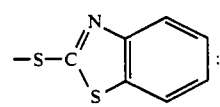

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and mercaptobenzothiazolyl groups of the formula:

and (d) from about 20 to about 55 weight percent of sulfur, a sulfur donor and mixtures thereof.

2. The rubber vulcanization composition of claim 1 wherein (a) from about 2.5 to 12.5 weight percent is bis-(2,5-polythio-1,3,4-thiadiazole); (b) from about 20 to 36 weight percent is a bismaleimide compound; (c) from about 17 to 42 weight percent is a sulfenamide compound; and (d) from about 23 to 43 weight percent is sulfur, a sulfur donor, and mixtures thereof.

3. The rubber vulcanization system of claim 1 wherein x and y are both an integer of from 2 to 4.

4. The rubber vulcanization system of claim 1 wherein x and y are 2.

5. The rubber vulcanization system of claim 1 wherein the molecular weight of said bis-(2,5-polythio-1,3,4-thiadiazole) ranges from about 328 to about 808.

6. The rubber vulcanization system of claim 1 wherein the molecular weight ranges from about 424 to 552.

7. The rubber vulcanization system of claim 1 wherein said bismaleimide is selected from the group consisting of N,N'-ethylenebismaleimide, N,N'-hexamethylenebismaleimide, N,N'-(m-phenylene)bismaleimide, N,N'-(p-phenylene)bismaleimide, N,N'-(p-tolylene)bismaleimide, N,N'-(methylenedi-p-phenylene)-bismaleimide, N,N'-(oxydi-p-phenylene)bismaleimide, $\alpha,\alpha$-bis-(4-p-phenylene)bismaleimide, and $\alpha,\alpha$-bis-(4-maleimidophenyl)-meta-diisopropylbenzene.

8. The rubber vulcanization system of claim 1 wherein said sulfenamide compound is selected from the group consisting of N-cyclohexyl-2-benzothiazylsulfenamide, N-isopropyl-2-benzothiazylsulfenamide, N-t-butyl-2-benzothiazyl-sulfenamide, N-t-butyl bis-(2-benzothiazylsulfen)amide, and N,N-dicyclohexyl-2-benzothiazylsulfenamide.

9. The rubber vulcanization system of claim 1 wherein said sulfur and sulfur donor are selected from the group consisting of elemental sulfur, an amide disulfide, polymeric polysulfide and sulfur olefin adducts.

* * * * *